(12) United States Patent
Jang et al.

(10) Patent No.: US 7,791,705 B2
(45) Date of Patent: Sep. 7, 2010

(54) LIQUID CRYSTAL DISPLAY APPARATUS

(75) Inventors: Jae-Hyuk Jang, Seoul (KR);
Dong-Seong Koo, Hwaseong-si (KR);
In-Sung Lee, Seoul (KR); Han-Jin Joo,
Yongin-si (KR)

(73) Assignee: Samsung Electronics Co., Ltd.,
Suwon-Si (KR)

( * ) Notice: Subject to any disclaimer, the term of this patent is extended or adjusted under 35 U.S.C. 154(b) by 431 days.

(21) Appl. No.: 11/322,015

(22) Filed: Dec. 29, 2005

(65) Prior Publication Data
US 2006/0152668 A1 Jul. 13, 2006

(30) Foreign Application Priority Data
Jan. 7, 2005 (KR) .................. 10-2005-0001692

(51) Int. Cl.
*G02F 1/1339* (2006.01)
*H01L 21/00* (2006.01)

(52) U.S. Cl. .................. 349/156; 349/154; 349/155; 349/187; 438/29; 438/30

(58) Field of Classification Search ......... 349/154–156, 349/187; 438/29–30
See application file for complete search history.

(56) References Cited
U.S. PATENT DOCUMENTS 6,067,144 A * 5/2000 Murouchi .............. 349/156
6,917,409 B2 * 7/2005 Kozhukh ............... 349/156
7,046,327 B2 * 5/2006 Okamoto et al. ........ 349/155
7,068,341 B2 * 6/2006 Nakayoshi et al. ...... 349/154
7,126,662 B2 * 10/2006 Choi et al. ............. 349/155
7,274,424 B1 * 9/2007 Kurihara et al. ........ 349/155
7,286,204 B2 * 10/2007 Yang et al. ............. 349/155
2004/0021819 A1 * 2/2004 Kadotani ............... 349/155
2005/0099577 A1 * 5/2005 Lee et al. .............. 349/155

FOREIGN PATENT DOCUMENTS

JP 09-073093 * 3/1997

* cited by examiner

*Primary Examiner*—Brian M. Healy
*Assistant Examiner*—Guy G Anderson
(74) *Attorney, Agent, or Firm*—F. Chau & Associates, LLC

(57) ABSTRACT

A liquid crystal display (LCD) apparatus is divided into a display area on which an image is displayed and a non-display area surrounding the display area. The LCD apparatus includes an organic insulating layer partially formed in the non-display area. A portion of the organic insulating layer is not formed, obtaining a vent space through which to exhaust air trapped when a first substrate is combined with a second substrate of the liquid crystal display apparatus. The LCD apparatus may rapidly and easily exhaust the trapped air from the display area and uniformly maintain the cell gap between the first and second substrates, improving display quality of the LCD apparatus.

20 Claims, 7 Drawing Sheets

LIQUID CRYSTAL DISPLAY APPARATUS

CROSS-REFERENCE TO RELATED APPLICATIONS

This application claims priority to Korean Patent Application No. 2005-1692, filed on Jan. 7, 2005, the contents of which are herein incorporated by reference in its entirety.

BACKGROUND OF THE INVENTION

1. Field of the Invention

The present invention relates to a liquid crystal display apparatus. More particularly, the present invention relates to a liquid crystal display apparatus capable of improving display characteristics thereof.

2. Description of the Related Art

In general, a liquid crystal display apparatus (LCD) displays an image using an optical characteristic of liquid crystal. The LCD apparatus includes a LCD panel that displays the image corresponding to an image signal using a light and a backlight assembly that transmits the light to the LCD panel.

The LCD panel includes a thin film transistor substrate on which a plurality of thin film transistors is formed in a matrix configuration, a color filter substrate facing the thin film transistor substrate, a liquid crystal layer that controls light transmittance in response to an electric field applied between the thin film transistor substrate and the color filter substrate, and a spacer that maintains a cell gap between the thin film transistor substrate and the color filter substrate.

In order to enhance productivity of the LCD panel, the thin film transistor substrate and the color filter substrate a reformed using a large-sized mother glass substrate. In particular, in the case of medium- or small-sized electronic devices such as a mobile phone, PDA, etc., the thin film transistor substrate and the color filter substrate are formed using a single mother glass substrate.

To form the LCD panel, a mother glass substrate on which a plurality of thin film transistor substrates is formed is combined with a mother glass substrate on which a plurality of color filter substrates is formed. The combined substrate is cut into LCD cells, yielding individual LCD panels. To facilitate the step of cutting the combined substrate into the individual LCD panels, the LCD cells are spaced apart from each other.

When the thin film transistor substrate and the color filter substrate are combined, an air layer is trapped between the thin film transistor substrate and the color filter substrate. When the trapped air layer is not exhausted from between the combined substrates, the cell gap between the two substrates is not uniformly maintained since a seal line becomes narrow. As a result, display quality of the LCD apparatus is deteriorated due to the cell gap of the LCD panel. Furthermore, when the seal line becomes narrow, Newton's rings (colored interference fringes) can occur at the narrowed seal line, deteriorating the display quality of the LCD apparatus.

SUMMARY OF THE INVENTION

Exemplary embodiments of the present invention provide a liquid crystal display apparatus capable of improving display characteristics thereof.

In one aspect of the present invention, a liquid crystal display apparatus comprises a first substrate, a second substrate, a liquid crystal layer and a first cell gap maintenance member.

The first substrate is divided into a first area on which an image is displayed and a second area that surrounds the first area. The first substrate includes an organic insulating layer pattern formed in the second area. The second substrate faces the first substrate and is combined with the first substrate. The liquid crystal layer is disposed between the first substrate and the second substrate and controls a transmittance of an externally provided light. The liquid crystal layer is formed in the first area. The first cell gap maintenance member is formed on the organic insulating layer pattern and maintains a distance between the first substrate and the second substrate by a predetermined distance. The first cell gap maintenance member is formed in the second area.

In a liquid crystal display apparatus, according to an exemplary embodiment of the present invention, the organic insulating layer formed in the second area is partially removed, obtaining a vent space through which the air trapped when the first substrate is combined with the second substrate can be exhausted.

BRIEF DESCRIPTION OF THE DRAWINGS

The present invention will become more apparent to those of ordinary skill in the art when descriptions of exemplary embodiments thereof are read with reference to the accompanying drawings, of which.

DETAILED DESCRIPTION OF THE EXEMPLARY EMBODIMENTS

Hereinafter, the exemplary embodiments of the present invention will be explained in detail with reference to the accompanying drawings.

Figure 1:
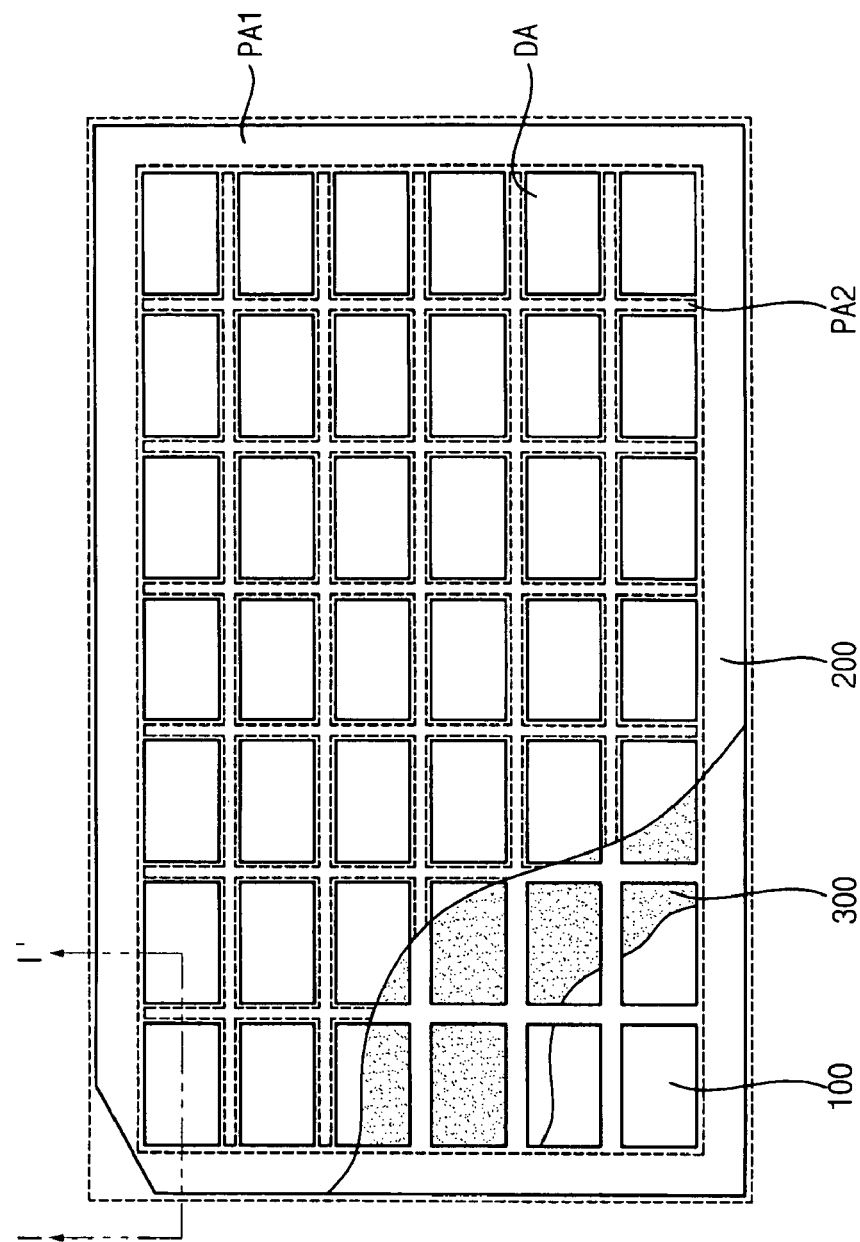
FIG. 1 is a plan view showing a liquid crystal display apparatus, according to an exemplary embodiment of the present invention.

FIG. 1 is a plan view showing a liquid crystal display apparatus, according to an exemplary embodiment of the present invention. Referring to FIG. 1, a liquid crystal display apparatus includes a first substrate 100, a second substrate 200 facing the first substrate 100, and a liquid crystal layer 300 interposed between the first substrate 100 and the second substrate 200.

Each of the first and second substrates 100 and 200 is divided into display areas DA and non-display areas surrounding the display areas DA. The non-display areas include a first non-display area PA1 surrounding the display areas DA and a second non-display area PA2 disposed between the display areas DA. For example, the first non-display area PA1 is an edge area of the first and second substrates 100 and 200. The first and second substrates 100 and 200 are cut into the display areas DA to form LCD panels.

Figure 2:
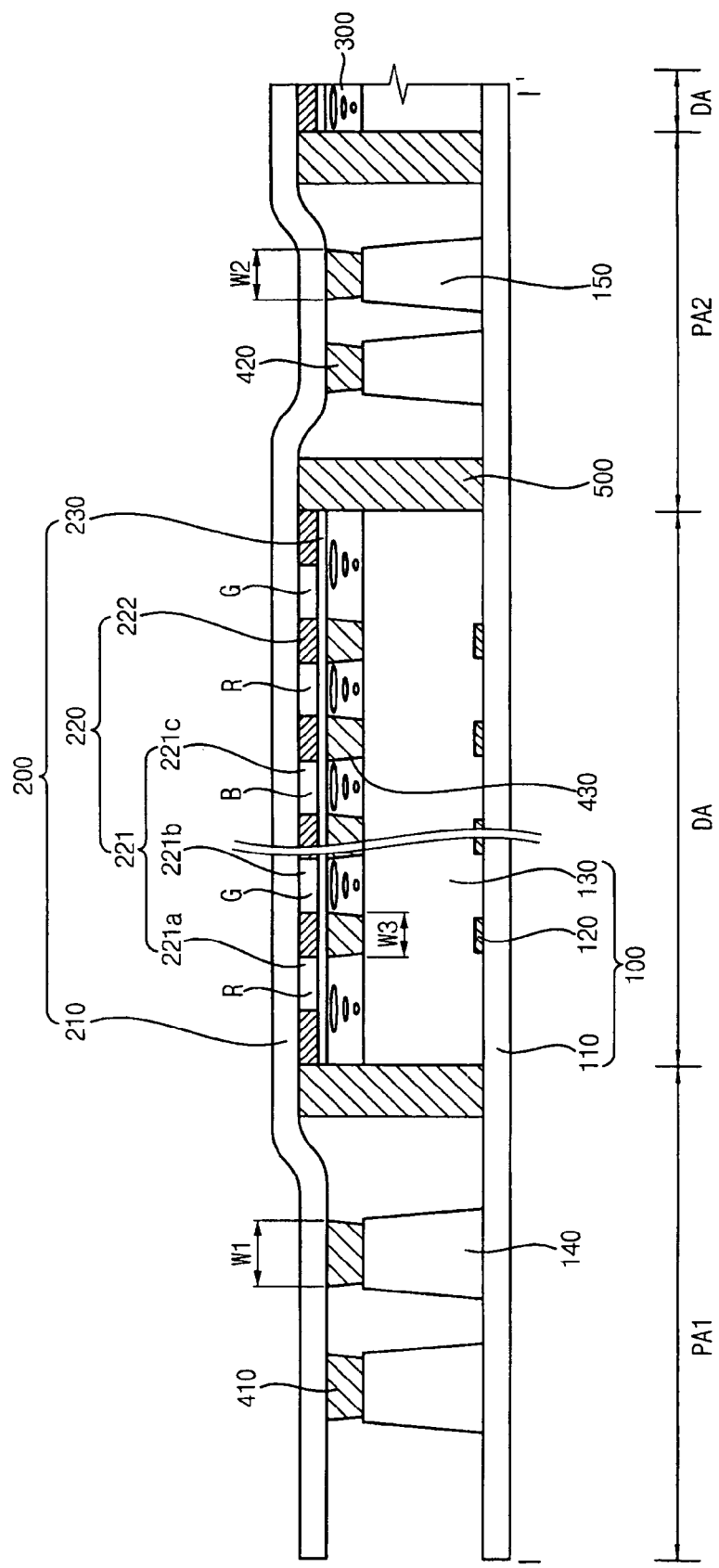
FIG. 2 is a cross-sectional view taken along a line I-I' of FIG. 1.

FIG. 2 is a cross-sectional view taken along a line I-I' in FIG. 1. Referring to FIG. 2, the LCD panel includes the first substrate 100, the second substrate 200, the liquid crystal layer 300, first, second and third spacers 410, 420 and 430 uniformly maintaining a distance (cell gap) between the first substrate 100 and the second substrate 200, and a sealant 500 coupling the first substrate 100 with the second substrate 200.

The first substrate 100 includes a first transparent substrate 110, a thin film transistor (TFT) 120 formed on the first transparent substrate 110 and acting as a switching device, a first organic insulating layer 130, a second organic insulating layer 140 and a third organic insulating layer 150 formed on the TFT 120.

In accordance with an embodiment of the present invention, the first transparent substrate 110 includes a transparent material, such as glass, quartz, sapphire, etc., to pass light onto the second substrate 200 from a backlight assembly (not shown) disposed under the first substrate 100.

The TFT 120 is formed in the display area DA in a matrix configuration. The TFT 120 provides the liquid crystal layer 300 with a signal voltage and/or blocks the signal voltage. Although not shown in FIG. 2, the display area DA includes pixels that display an image. Each of the pixels includes the TFT 120 formed therein and receives the signal voltage.

The first organic insulating layer 130, the second organic insulating layer 140 and the third organic insulating layer 150 are formed on the first transparent substrate 110 on which the TFT 120 is formed.

The first organic insulating layer 130 is formed on the TFT 120 in the display area DA to protect the TFT 120. The second organic insulating layer 140 is partially removed from the first non-display area PA1. The second organic insulating layer 140 is formed on the first non-display area PA1 corresponding to the first spacer 410. The third organic insulating layer 150 is partially removed from the first and second non-display areas PA1 and PA2, and corresponds to the second spacer 420.

Since the second and third organic insulating layers 140 and 150 formed in the first and second non-display areas PA1 and PA2, respectively, are partially removed from the first transparent substrate 110, a trapped air layer between the first and second substrates 100 and 200 may be exhausted when the first and second substrates 100 and 200 are combined with each other. The air is exhausted through the vent space where the second and third organic insulating layers 140 and 150 are removed from the first and second non-display areas PA1 and PA2, respectively. Thus, the LCD apparatus may rapidly and easily exhaust the trapped air since the LCD apparatus obtains a vent space through which the air is exhausted due to the removed portion of the second and third organic insulating layers 140 and 150. Further, the liquid crystal display apparatus may prevent the air layer from being formed in the display areas DA and the sealant 500 from being deformed due to the air layer. As a result, the liquid crystal display apparatus may uniformly maintain the cell gap between the first and second substrates 100 and 200, improving display characteristics thereof.

The second substrate 200 is disposed on the first substrate 100. The second substrate 200 includes a second transparent substrate 210, a color filter layer 220 that displays a predetermined color using the light, and a common electrode 230 that applies a common voltage to the liquid crystal layer 300. The second transparent substrate 210 can include the same material as the first transparent substrate 110.

The color filter layer 220 and the common electrode 230 are sequentially formed on the second transparent substrate 210. For example, the color filter layer 220 can be formed in the display areas DA by a thin film process. The color filter layer 220 includes color pixels 221 that display a predetermined color using the light transmitted from the liquid crystal layer 300. The color filter layer 220 includes a black matrix 222 that surrounds the color pixels 221 and prevents light leakage in the areas between the color pixels 221, improving a contrast ratio.

The color pixels 221 include red, green and blue (RGB) color pixels 221a, 221b and 221c, and one of the RGB color pixels 221a, 221b and 221c is formed in each pixel. The RGB color pixels 221a, 221b and 221c can include a photoresist having red, green and blue pigments or dyes.

Photolithography can be used to form the RGB color pixels 221a, 221b and 221c. In an embodiment of the present invention, the RGB color pixels 221a, 221b and 221c have a height from about 1.0 micrometer to about 2.0 micrometers, and are arranged in a constant pattern.

The black matrix 222 prevents light leakage in the areas between the RGB color pixels 221a, 221b and 221c to improve a contrast ratio. The black matrix 222 may include chromium (Cr) or chromium oxide (CrOx), or a photoresist in which a carbon pigment or a RGB pigment is mixed. The thin film transistor 120 is formed in an area corresponding to the black matrix 222, preventing the thin film transistor 121 from being outwardly exposed.

The common electrode 230 disposed on the color filter layer 220 is formed in the display area DA. The common electrode 230 may include a transparent conductive metal, for example, such as indium tin oxide (ITO), indium zinc oxide (IZO), etc. The common electrode 230 applies the common voltage to the liquid crystal layer 300.

The liquid crystal layer 300 is disposed between the first substrate 100 and the second substrate 200. The liquid crystal layer 300 is formed in the display area DA, and the light transmittance of the liquid crystal 300 is controlled in response to the electric field generated between the first substrate 100 and the common electrode 230.

The first, second and third spacers 410, 420 and 430 are disposed between the first substrate 100 and the second substrate 200 such that the first substrate 100 is spaced apart from the second substrate 200. The first, second and third spacers 410, 420 and 430 may include an elastic material and can be formed in a column spacer by photolithography.

The first, second and third spacers 410, 420 and 430 are formed on either one of the first substrate 100 or the second substrate 200. When the first, second and third spacers 410, 420 and 430 are formed on the first substrate 100, the thin film transistor 120 or wires may exhibit electrically defective connections due to a pressure applied to the first substrate 100 during the photolithography in forming the first, second and third spacers 410, 420 and 430. In accordance with an embodiment of the present invention, the first, second and third spacers 410, 420 and 430 are formed on the second substrate 200.

In an embodiment of the present invention, the first spacer 410 is formed in the first non-display area PA1 and formed on the second organic insulating layer 140. The second spacer 420 is formed in the second non-display area PA2 and formed on the third organic insulating layer 150.

Since the liquid crystal layer 300 is not formed in the first and second non-display areas PA1 and PA2, the first substrate 100 is in contact with the second substrate 200, or the cell gap between the first and second substrates 100 and 200 in the first non-display area PA1 and the cell gap between the first and second substrates 100 and 200 in the second non-display area PA2 may be smaller than the cell gap between the first and second substrates 100 and 200 corresponding to the display area DA. As a result, the trapped air layer between the first and second substrates 100 and 200 may not be exhausted when the first substrate 100 is combined with the second substrate 200. However, when the first, second and third spacers 410, 420 and 430 are formed between the first and second substrates 100 and 200, it is possible to rapidly and easily exhaust the trapped air.

The third spacer 430 formed in the display area DA uniformly maintains the cell gap in the display area DA. The first spacer 410 has a width W1 that is larger than a width W2 of the second spacer 420. The width W2 of the second spacer 420 is larger than a width W3 of the third spacer 430. According to an exemplary embodiment of the present invention, the widths W1 and W2 of the first and second spacers 410 and 420 are about ten times to about twenty times larger than the width W3 of the third spacer 430. For example, when the width W3 of the third spacer 430 is about ten micrometers, the width W1 of the first spacer 410 is from about 100 micrometers to about 200 micrometers, and the width W2 of the second spacer 420 is also from about 100 micrometers to about 200 micrometers. For example, since the width W1 of the first spacer 410 is larger than the width W2 of the second spacer 420, the first spacer 410 has the width W1 of about 200 micrometers and the second spacer 420 has the width W2 of about 100 micrometers.

The sealant 500 is disposed between the first substrate 100 and the second substrate 200 and surrounds the display area DA. The sealant 500 combines the first substrate 100 with the second substrate 200 to seal the liquid crystal layer 300.

To combine the first substrate 100 with the second substrate 200, the sealant 500 is coated on either one of the first substrate 100 and the second substrate 200. When the first substrate 100 on which the sealant 500 is formed is combined with the second substrate 200, and the liquid crystal is injected between the first and second substrates 100 and 200 in a vacuum injection method, the liquid crystal layer 300 is formed between the first and second substrates 100 and 200. The sealant 500 is cured, for example, by exposure to an ultraviolet light transmitted to the first and second substrates 100 and 200.

Figure 3:
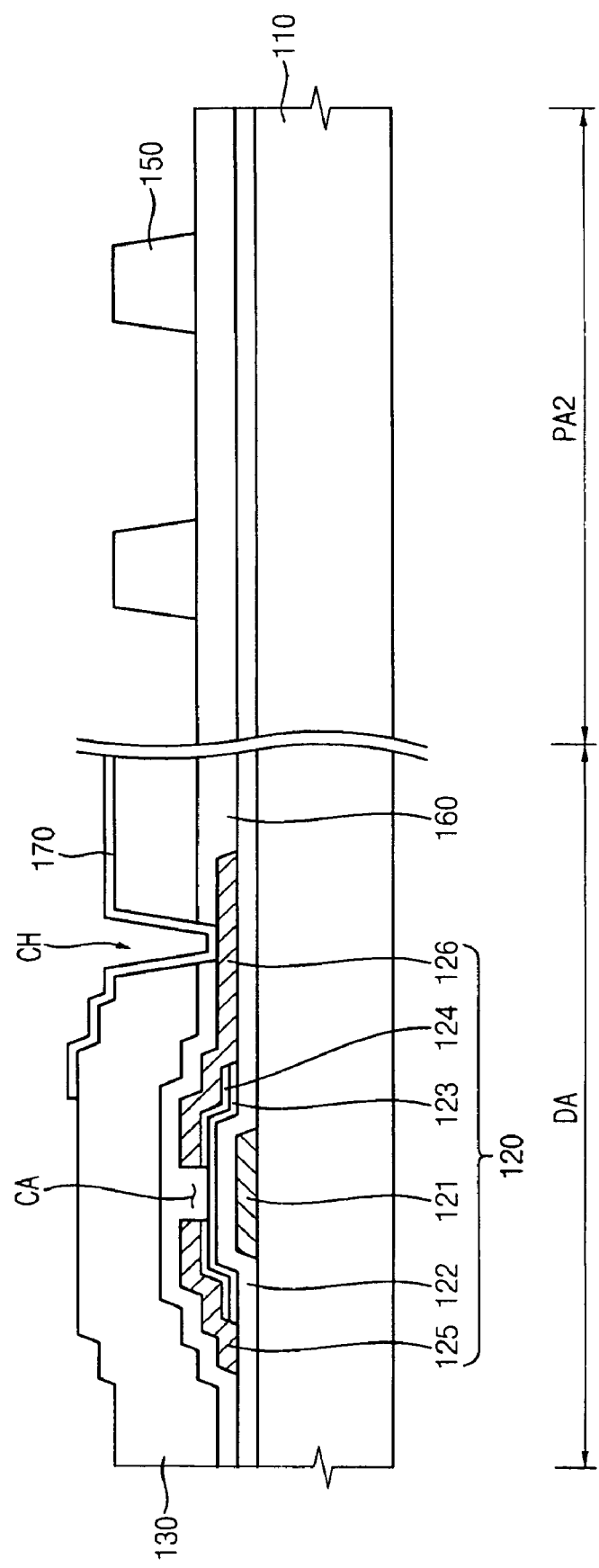
FIG. 3 is a partially enlarged cross-sectional view showing the first substrate of FIG. 2.

FIG. 3 is a partially enlarged cross-sectional view showing the first substrate of FIG. 2. Referring to FIG. 3, the thin film transistor 120 formed on the first substrate 100 includes a gate electrode 121 on the first transparent substrate 110, a gate insulating layer 122 on the gate electrode 121, an active layer 123 on the gate insulating layer 122, an ohmic contact layer 124 on the active layer 123, a source electrode 125 on the ohmic contact layer 124 and a drain electrode 126 on the ohmic contact layer 124.

The gate electrode 121 is branched from a gate line (not shown) through which a gate signal is transmitted. The gate electrode 121 receives the gate signal from the gate line. The gate electrode 121 includes a conductive metal material, for example, such as aluminum (Al), aluminum neodymium (AlNd), chromium (Cr), molybdenum (Mo), etc. In an embodiment of the present invention, the gate electrode 121 is formed in a signal layer. The gate electrode 121 may be formed in multiple layers such as a double layer or a triple layer.

The gate insulating layer 122 is formed on the first transparent substrate 110 on which the gate electrode 121 is formed. The gate insulating layer 122 includes an insulating material such as silicon oxide ($SiO_2$), silicon nitride ($SiN_X$), etc.

The active layer 123 is formed on the gate insulating layer 122 to cover the gate electrode 121. The active layer 123 can include polycrystalline silicon. The ohmic contact layer 124 formed on the active layer 123 includes an $N^+$ polycrystalline silicon. A center portion of the ohmic contact layer 124 is removed to form a channel area CA through which the active layer 123 is partially exposed.

The source and drain electrodes 125 and 126 are formed on the ohmic contact layer 124. The source and drain electrodes 125 and 126 include a conductive metal material, for example, such as aluminum (Al), aluminum neodymium (AlNd), chromium (Cr), molybdenum (Mo), etc.

In an embodiment of the present invention, the source and drain electrodes 125 and 126 are formed in a signal layer. The source and drain electrodes 125 and 126 may be formed in multiple layers such as a double layer or a triple layer.

The source electrode 125 is branched from a data line (not shown) transmitting a data signal. The source electrode 125 receives the data signal from the data line. A first end of the source electrode 125 is disposed on the ohmic contact layer 124, and a second end of the source electrode 125 is disposed on the gate insulating layer 122.

The drain electrode 126 is spaced apart from the source electrode 125 by the channel area CA. A first end of the drain electrode 126 is disposed on the ohmic contact layer 124, and a second end of the drain electrode 126 is disposed on the gate insulating layer 122.

A passivation layer 160 is formed on the first transparent substrate 110 on which the thin film transistor 120 is formed. The passivation layer 160 protects the thin film transistor 120 and the various wires formed on the first transparent substrate 110. The passivation layer 160 can include an inorganic insulating material such as silicon oxide ($SiO_2$), silicon nitride ($SiN_X$), etc. In an embodiment of the present invention, the passivation layer 160 has a thickness of about 2000 angstroms.

The first and third organic insulating layers 130 and 150 are formed on the passivation layer 160. The third organic insulating layer 150 formed in the second non-display area PA2 is partially formed on the passivation layer 160.

The first organic insulating layer 130 and the passivation layer 160 formed in the display area DA are partially removed to formed a contact hole CH therethrough such that the drain electrode 126 is partially exposed through the contact hole CH.

A pixel electrode 170 is formed on the first organic insulating layer 130 to apply the signal voltage to the liquid crystal layer 300. The pixel electrode 170 is electrically connected to the drain electrode 126 through the contact hole CH. The pixel electrode 170 includes a conductive oxide material such as indium tin oxide, indium zinc oxide, etc.

Although not shown in the figures, in the case that the LCD apparatus is a transreflective type LCD apparatus, the LCD apparatus may further include a reflective electrode formed on the pixel electrode 170 to reflect an external light.

Figure 4:
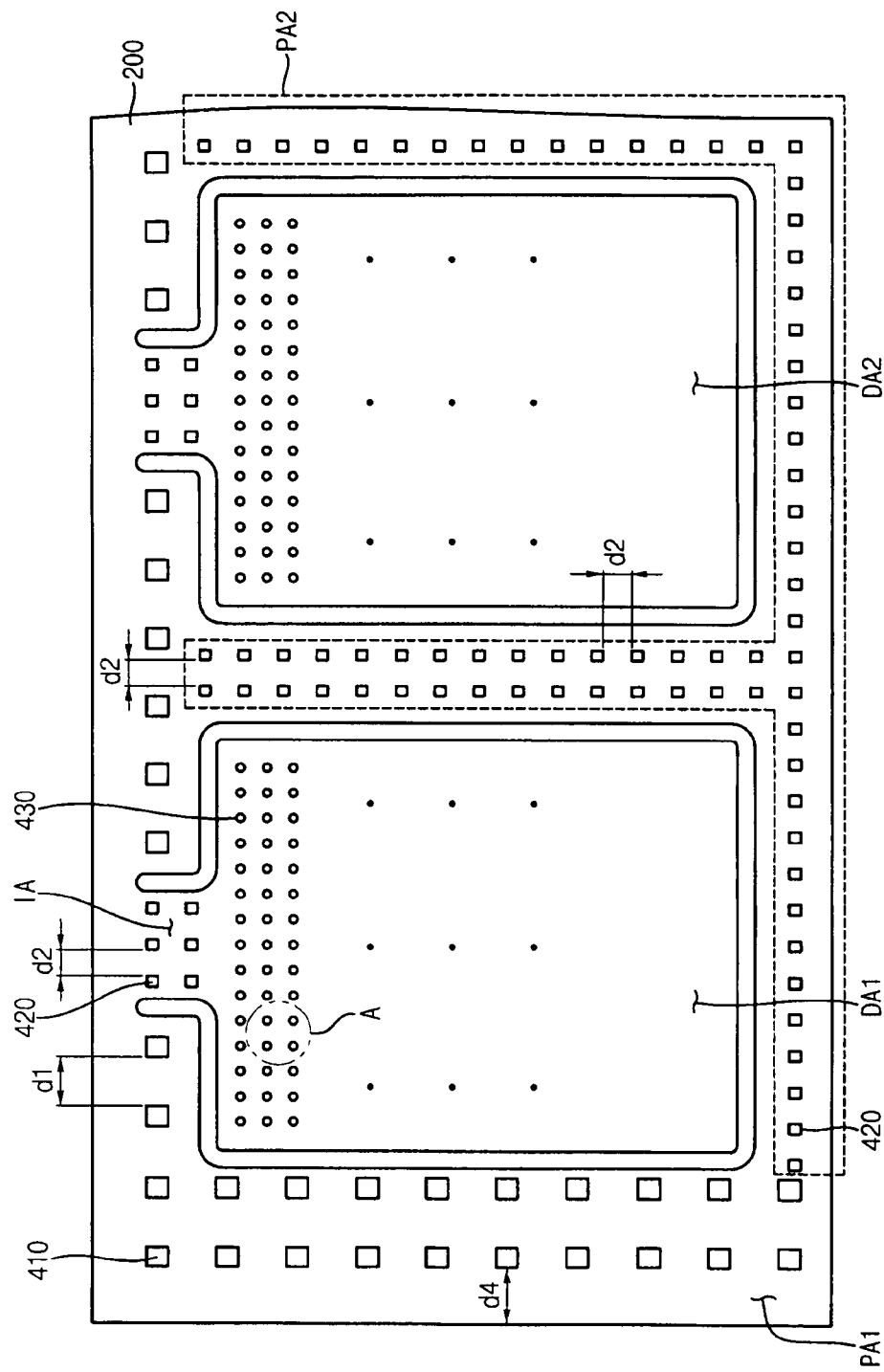
FIG. 4 is a plan view showing the liquid crystal display apparatus of FIG. 2.
Figure 5:
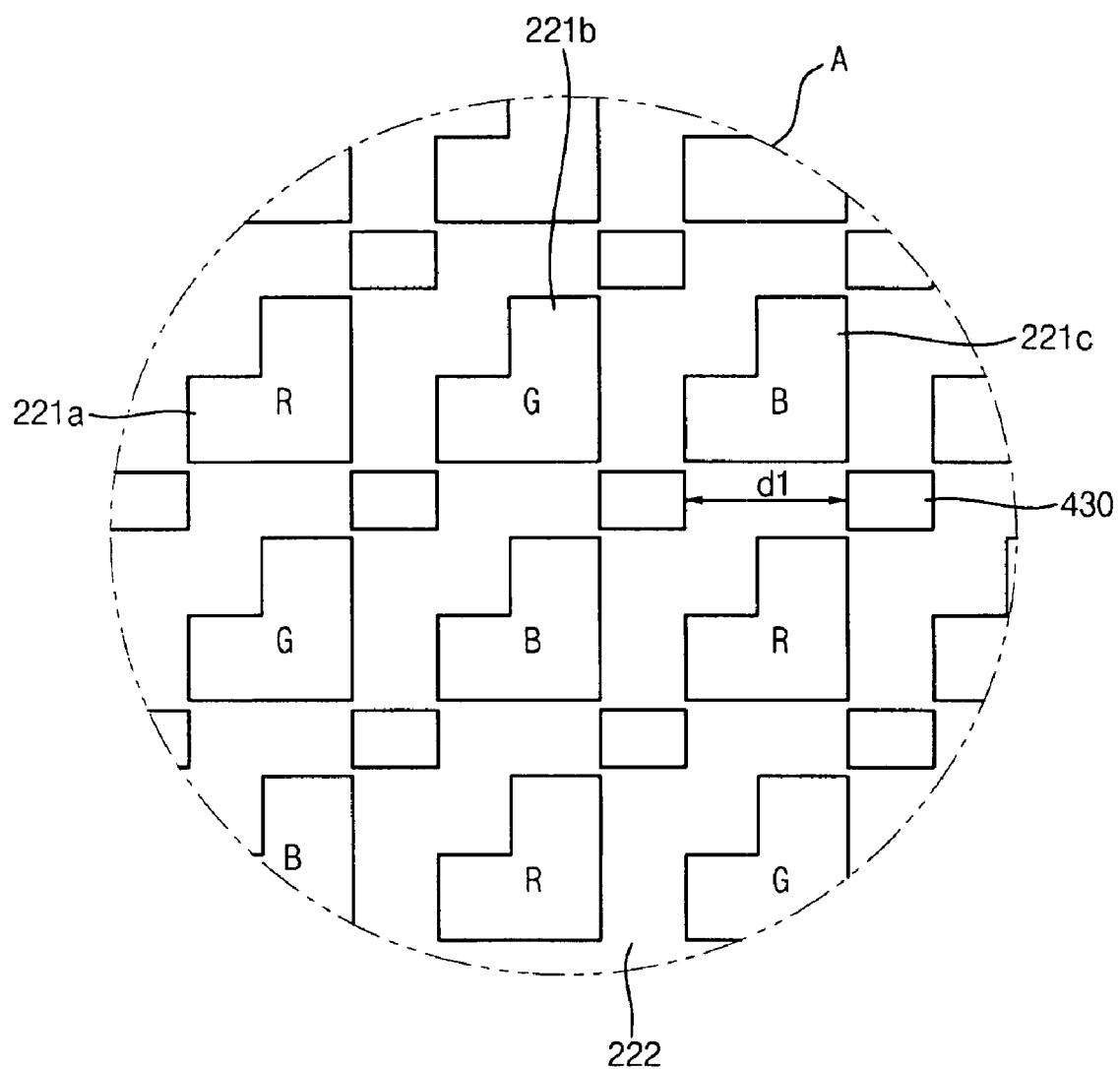
FIG. 5 is an enlarged view showing the portion "A" of FIG. 4.

FIG. 4 is a plan view showing the liquid crystal display apparatus of FIG. 2. FIG. 5 is an enlarged view showing the portion "A" of FIG. 4. Referring to FIGS. 4 and 5, the first spacer 410 is formed in the first non-display area PA2 of the second substrate 200. The first spacer 410 is spaced apart from an adjacent first spacer by a first distance D1. For example, a shortest distance between the first spacer 410 and an edge of the second substrate 200 is about 5 millimeters.

The second spacer 420 is formed in the second non-display area PA2 disposed between the first display area DA1 and the second display area DA2 adjacent to the first display area DA1. The second spacer 420 is spaced apart from an adjacent second spacer by a second distance D2 smaller than the first distance D1. For example, when the second distance D2 is about 1000 micrometers, the first distance D1 is about 2500 micrometers.

The third spacer 430 is formed in the first and second display areas DA1 and DA2 of the second substrate 200. Referring to FIG. 5, the third spacer 430 is disposed on the black matrix 222. The third spacer 430 is spaced apart from an adjacent third spacer by a third distance D3 smaller than the second distance D2. The third distance D3 may be increased or reduced in accordance with a size of the LCD apparatus and a size of the pixel of the LCD apparatus.

Referring to FIG. 4, the first and second distances D1 and D2 are about 4 times to about 6 times larger than the third distance D3. Thus, a pressure applied to the first and second spacers 410 and 420 from the first and second substrates 100 and 200, respectively, is larger than a pressure applied to the third spacer 430. Due to the difference of the pressures applied to the first, second and third spacers 410, 420 and 430, the first and second spacers 410 and 420 have a larger size than the third spacer 430.

As described above, the first distance D1 of the first spacer 410, the second distance D2 of the second spacer 420 and the third distance D3 of the third spacer 430 are different from each other. The first and second distances D1 and D2 are larger than the third distance D3 of the third spacer 430. Thus, the vent space through which the trapped air is exhausted may be widely obtained. As a result, the liquid crystal display apparatus may prevent the seal line from being narrowed and uniformly maintain the cell gap between the first and second substrates 100 and 200 since the liquid crystal display apparatus may rapidly and easily exhaust the air between the first and second substrates 100 and 200.

The sealant 500 surrounding the first display area DA1 is partially opened to form a liquid crystal injection port IA through which the liquid crystal for the liquid crystal layer 300 is injected. The second spacer 420 is also formed at the liquid crystal injection port IA. The second spacer 420 formed at the liquid crystal injection port IA separates the first and second substrates 100 and 200 from each other such that the trapped air between the first and second substrates 100 and 200 is rapidly and easily exhausted through the liquid crystal injection port IA.

Figure 6:
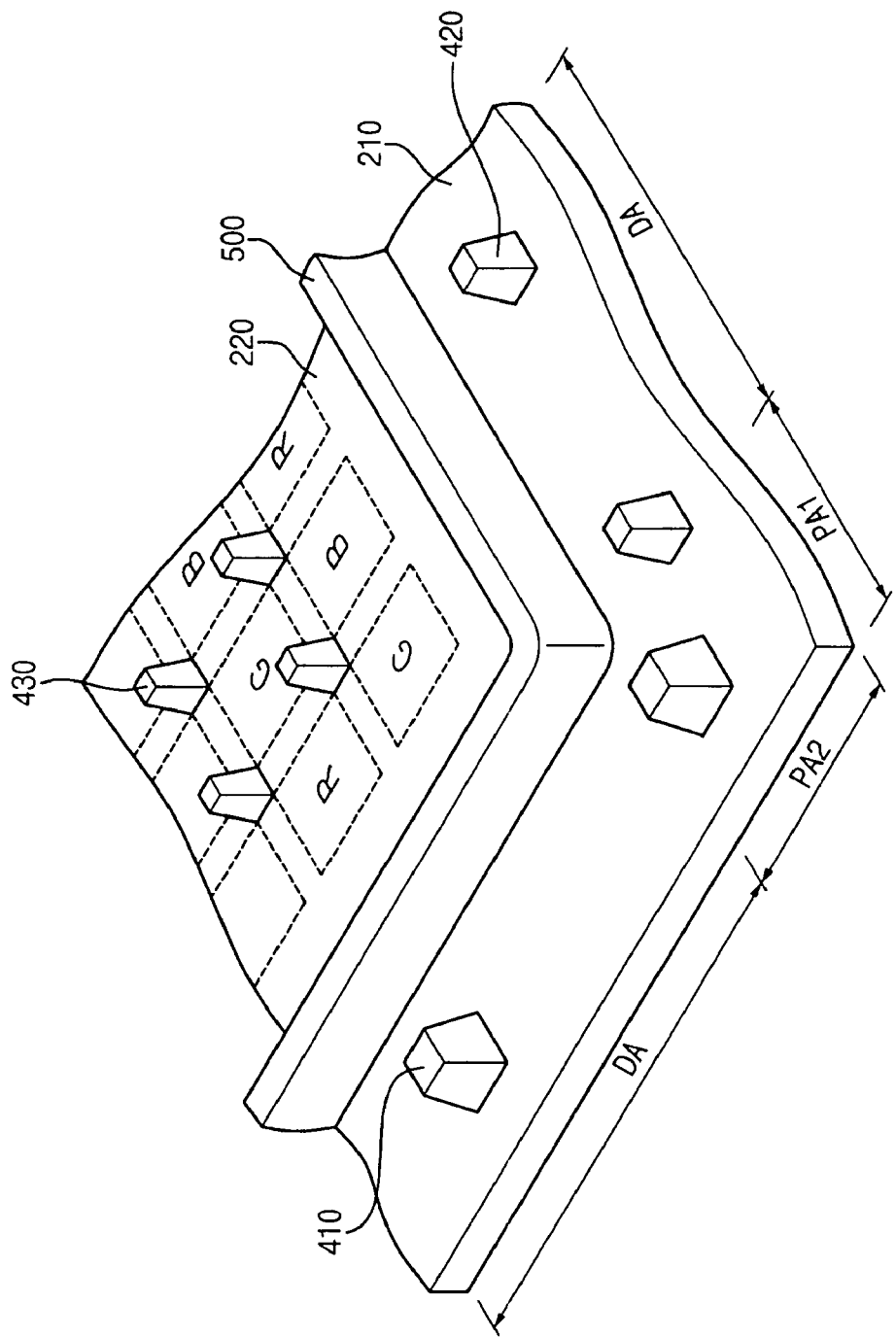
FIG. 6 is a partially enlarged perspective view showing the second substrate of FIG. 2.

FIG. 6 is a partially enlarged perspective view showing the second substrate of FIG. 2. Referring to FIG. 6, the color filter layer 220 is formed in the display area DA of the second substrate 200. The third spacer 430 is formed on the color filter layer 220. The third spacer 430 has a thickness that gradually decreases from a lower portion thereof toward an upper portion thereof. The lower portion and the upper portion make contact with the color filter layer 220 and the first substrate 100, respectively. Thus, a side face of the third spacer 430 has a parallelogram.

In accordance with embodiments of the present invention, the first, second and third spacers 410, 420 and 430 may have various shapes such as a rectangular prism, a cylinder, etc.

The sealant 500 surrounds the color filter layer 220.

The first spacer 410 is formed on the second transparent substrate 210 corresponding to the first non-display area PA1. The second spacer 420 is formed on the second transparent substrate 210 corresponding to the second non-display area PA2. The first and second spacers 410 and 420 are spaced apart from the sealant 500 by a predetermined distance.

The first and second spacers 410 and 420, according to an embodiment of the present invention, have the same shape as the third spacer 430. The first, second and third spacers 410, 420 and 430, according to an embodiment of the present invention, have different widths but have the same height as one another.

Figure 7:
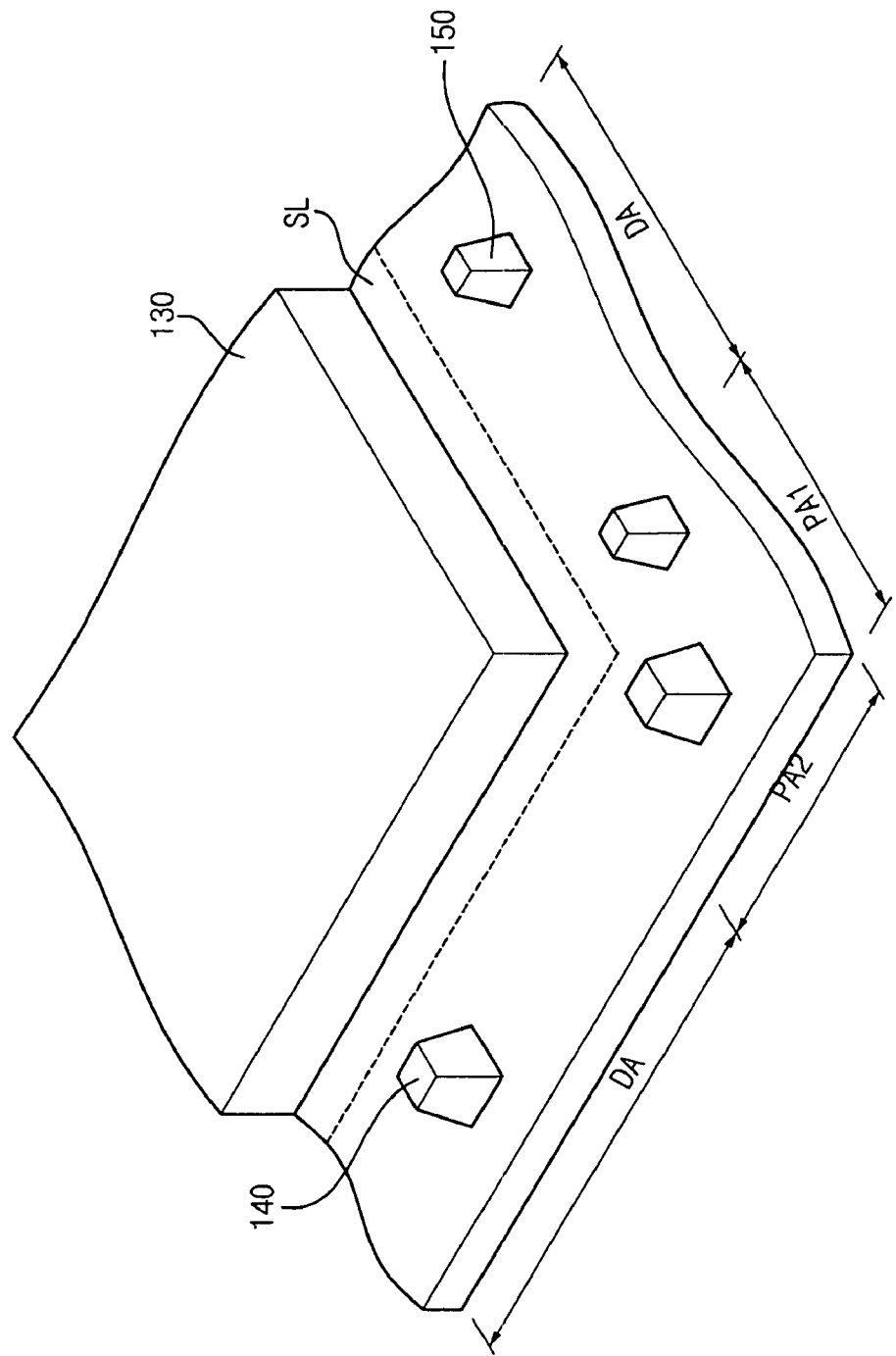
FIG. 7 is a partially enlarged view showing the first substrate of FIG. 2.

FIG. 7 is a partially enlarged view showing the first substrate of FIG. 2. Referring to FIG. 7, the first organic insulating layer 130 is formed over the first transparent substrate 110 corresponding to the display area DA.

Although not shown in the figures, the first organic insulating layer 130 formed in the display area DA corresponds to the third spacer 430 of FIG. 6.

The second and third organic insulating layers 140 and 150 are formed in the first and second non-display areas PA1 and PA2, respectively, but the second third organic insulating layers 140 and 150 are not formed in an area on which the seal line SL is formed. The second and third organic insulating layers 140 and 150 formed in the first and second non-display area PA1 and PA2 have a thickness that gradually decreases from a lower portion thereof toward an upper portion thereof. The lower portion of the second and third organic insulating layers 140 and 150 make contact with the first transparent substrate 110.

Although not shown in the figures, the second organic insulating layer 140 formed in the first non-display area PA1 corresponds to the first spacer 410, and the third organic insulating layer 150 formed in the second non-display area PA2 corresponds to the second spacer 420.

According to the above, the LCD apparatus includes the organic insulating layers partially formed in the first and second non-display areas. The first and second spacers formed in the first and second non-display areas, respectively, are disposed on the organic insulating layers. The LCD apparatus may obtain the vent space through which the trapped air is exhausted by the removed portion of the organic insulating layers.

The LCD apparatus may prevent the seal line from being narrowed since the LCD apparatus may exhaust the trapped air from the display area thereof. As a result, the LCD apparatus may uniformly maintain the cell gap between the first and second substrates and improve the display quality thereof.

The first and second spacers formed in the first and second non-display areas, respectively, have the larger width than the third spacer formed in the display area. Also, the first distance of the first spacers and the second distance of the second spacers are wider than the third distance of the third spacers. The number of the first and second spacers per unit surface area is smaller than the number of third spacers per unit surface area; however, the first and second spacers are larger in size than the third spacer. The LCD apparatus, according to embodiments of the present invention, may uniformly maintain the cell gap between the first and second substrates and the trapped air may be rapidly and easily exhausted from the display area of the LCD apparatus, improving the display quality thereof.

Although the exemplary embodiments of the present invention have been described in detail with reference to the accompanying drawings for the purpose of illustration, it is understood that the inventive processes and apparatus are not to be construed as limited thereby. It will be readily apparent to those of reasonable skill in the art that various modifications to the foregoing exemplary embodiments can be made by without departing from the scope of the present invention as defined by the appended claims, with equivalents of the claims to be included therein.

What is claimed is:

1. A liquid crystal display comprising:
   a first substrate divided into a first area displaying an image and being surrounded by a sealing member and a second area surrounding the sealing member, the first substrate including a plurality of first organic insulating layer patterns in the second area, wherein the first organic insulating layer patterns are spaced apart from each other thereby forming an outgasing space;
   a second substrate facing the first substrate;

a liquid crystal layer disposed in the first area between the first substrate and the second substrate;

a plurality of first cell gap maintenance members formed in the second area on the first organic insulating layer patterns to maintain a predetermined distance between the first substrate and the second substrate; and a plurality of second cell gap maintenance members formed in the first area to maintain a predetermined distance between the first substrate and the second substrate.

2. The liquid crystal display of claim 1, further comprising a plurality of second organic insulating layer patterns formed in the first area, wherein the first organic insulating layer patterns and the second organic insulating layer patterns are spaced apart from each other by a predetermined distance.

3. The liquid crystal display of claim 1, wherein the first cell gap maintenance members have a width from about ten to about twenty times larger than that of the second cell gap maintenance members.

4. The liquid crystal display of claim 3, wherein the width of first cell gap maintenance members is from about 100 micrometers to about 200 micrometers.

5. The liquid crystal display of claim 3, wherein the first cell gap maintenance members comprise:
a first spacer adjacent to an edge of the first substrate, the first spacer having a first width; and
a second spacer disposed between the first area and an adjacent first area, the second spacer having a second width smaller than the first width.

6. The liquid crystal display of claim 5, wherein the first width is about 200 micrometers.

7. The liquid crystal display of claim 5, wherein the second width is about 100 micrometers.

8. The liquid crystal display of claim 1, wherein the first cell gap maintenance members comprise a plurality of first spacers spaced apart from each other by a first distance and disposed adjacent to an edge of the first substrate, and a plurality of second spacers spaced apart from each other and disposed between the first area and an adjacent first area, and adjacent cell gap maintenance members are spaced apart from each other by a second distance, and the first distance is from about four times to about six times larger than the second distance.

9. The liquid crystal display of claim 1, wherein the first cell gap maintenance members comprise:
a plurality of first spacers spaced apart from each other by a third distance and disposed adjacent to an edge of the first substrate, and
a plurality of second spacers spaced apart from each other by a fourth distance smaller than the third distance and disposed between the first area and an adjacent first area.

10. The liquid crystal display of claim 1, wherein a shortest distance between an edge of the first substrate and the first cell gap maintenance members is about 5 millimeters.

11. The liquid crystal display of claim 1, wherein the sealing member combines the first substrate with the second substrate to seal the liquid crystal layer.

12. The liquid crystal display of claim 11, wherein the sealing member comprises a liquid crystal injection port to inject liquid crystal forming the liquid crystal layer.

13. The liquid crystal display of claim 12, wherein a portion of the first cell gap maintenance members is disposed at the liquid crystal injection port.

14. The liquid crystal display of claim 13, wherein the first cell gap maintenance members disposed at the liquid crystal injection port have a width substantially identical to that of the first cell gap maintenances placed between the first area and an adjacent first area.

15. The liquid crystal display of claim 14, wherein a distance between adjacent first cell gap maintenance members at the liquid crystal injection port is substantially identical to a distance between adjacent first cell gap maintenance members disposed between the first area and the adjacent first area.

16. A liquid crystal display comprising:
a first substrate divided into a first area displaying an image and being surrounded by a sealing member and a second area surrounding the sealing member;
a second substrate facing the first substrate;
a liquid crystal layer disposed in the first area between the first substrate and the second substrate;
a plurality of first organic insulating layer patterns formed on the first substrate in the second area, wherein the first organic insulating layer patterns are spaced apart from each other thereby forming an outgasing space;
a plurality of second organic insulating layer patterns formed on the first substrate in the first area, wherein the first organic insulating layer patterns and the second organic insulating layer patterns are spaced apart from each other by a predetermined distance;
a plurality of first cell gap maintenance members formed in the second area on the first organic insulating layer patterns to maintain a predetermined distance between the first substrate and the second substrate; and
a plurality of second cell gap maintenance members formed in the first area to maintain a predetermined distance between the first substrate and the second substrate,
wherein adjacent first cell gap maintenance members are spaced apart from each other by a first distance, and adjacent second cell gap maintenance members are spaced apart from each other by a second distance different from the first distance.

17. The liquid crystal display of claim 16, wherein the first distance is from about 4 times to about six times larger than the second distance.

18. The liquid crystal display of claim 17, wherein the first cell gap maintenance members comprise:
a plurality of first spacers spaced apart from each other by a third distance and disposed adjacent to an edge of the first substrate, and
a plurality of second spacers spaced apart from each other by a fourth distance smaller than the third distance and disposed between the first area and an adjacent first area.

19. The liquid crystal display of claim 16, wherein the first cell gap maintenance members have a width from about ten times to about twenty times larger than that of the second cell gap maintenance members.

20. The liquid crystal display of claim 19, wherein the first cell gap maintenance members comprise:
a first spacer adjacent to an edge of the first substrate and having a first width; and
a second spacer disposed between the first area and an adjacent first area and having a second width smaller than the first width.

* * * * *